(12) United States Patent
Hsu et al.

(10) Patent No.: US 9,394,459 B2
(45) Date of Patent: Jul. 19, 2016

(54) COATING COMPOSITION

(75) Inventors: Shui-Jen Raymond Hsu, Westlake, OH (US); Vic Stanislawczyk, Strongsville, OH (US); Ioan Marcu, Medina, OH (US); Darlene D. Rota, Avon, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 13/982,863

(22) PCT Filed: Feb. 6, 2012

(86) PCT No.: PCT/US2012/003943
§ 371 (c)(1),
(2), (4) Date: Jul. 31, 2013

(87) PCT Pub. No.: WO2012/109130
PCT Pub. Date: Aug. 16, 2012

(65) Prior Publication Data
US 2014/0342096 A1    Nov. 20, 2014

Related U.S. Application Data

(60) Provisional application No. 61/440,899, filed on Feb. 9, 2011.

(51) Int. Cl.
| | | |
|---|---|---|
| *C09D 133/02* | (2006.01) | |
| *C09D 133/20* | (2006.01) | |
| *C09D 4/00* | (2006.01) | |
| *C08F 220/14* | (2006.01) | |
| *C08F 220/18* | (2006.01) | |
| *C09D 133/08* | (2006.01) | |
| *C09D 135/00* | (2006.01) | |
| *C08K 3/22* | (2006.01) | |

(52) U.S. Cl.
CPC ............ *C09D 133/20* (2013.01); *C08F 220/14* (2013.01); *C08F 220/18* (2013.01); *C09D 4/00* (2013.01); *C09D 133/02* (2013.01); *C09D 133/08* (2013.01); *C09D 135/00* (2013.01); *C08K 3/22* (2013.01); *C08K 2003/2296* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 3,026,281 A | 3/1962 | Harren et al. | |
| 6,790,272 B1 * | 9/2004 | Zhao et al. ................ | 106/286.8 |
| 2002/0146515 A1 * | 10/2002 | Schwartz ............... | B05D 7/542 |
| | | | 427/409 |
| 2006/0047062 A1 | 3/2006 | Hsu et al. | |
| 2007/0248837 A1 | 10/2007 | Hsu et al. | |

FOREIGN PATENT DOCUMENTS

| | | |
|---|---|---|
| DE | 1520959 A1 | 6/1969 |
| EP | 2418229 A1 | 2/2012 |
| WO | 2011002831 A1 | 1/2011 |

* cited by examiner

*Primary Examiner* — Satya Sastri
(74) *Attorney, Agent, or Firm* — Samuel B. Laferty, Esq.; Teresan W. Gilbert, Esq.

(57) ABSTRACT

The disclosed invention relates to a coating composition, comprising: water; a multivalent transition metal oxide, hydroxide and/or salt; and a polymer comprising repeating units derived from itaconic acid. The coating composition may be used to coat masonry substrates, and the like.

20 Claims, No Drawings

COATING COMPOSITION

TECHNICAL FIELD

This invention relates to coating compositions and, more particularly, to water based coating compositions used for masonry substrates, and the like. These coating compositions contain zinc oxide and a resin binder in the form of a polymer that includes repeating units derived from itaconic acid.

BACKGROUND OF THE INVENTION

Coatings for masonry substrates and the like typically require resin binders with good elongation characteristics. Water based coating compositions with resin binders derived from carboxylic acid functional monomers are often used. Zinc oxide is widely used as a coating additive, especially for exterior coating applications. A problem with using zinc oxide in water based coating compositions of this type is that the zinc oxide generates zinc ions which often form complexes with the carboxylic acid groups. This tends to reduce the elasticity of the coating. This invention provides a solution to this problem.

SUMMARY OF THE INVENTION

This invention relates to a coating composition comprising: water; a multivalent transition metal oxide, hydroxide and/or salt; and a polymer comprising (a) from about 0.5 to about 3 wt. % based on the weight of the polymer of repeating units derived from itaconic acid; (b) from about 0 to about 2 wt % based on the weight of the polymer of repeating units derived from acrylic acid; (c) from about 94.5 to about 99.5 wt % based on the weight of the polymer of repeating units derived from one or more non-ionic mono-ethylenically unsaturated monomers; (d) from about 0 to about 5 wt % based on the weight of the polymer of repeating units derived from one or more multi-ethylenically unsaturated monomers; and (e) from about 0 to about 2 wt % based on the weight of the polymer of repeating units derived from one or more anionic mono-ethylenically unsaturated monomers other than itaconic acid and acrylic acid. The polymer, which may be referred to as a resin binder, may have a glass transition temperature in the range from about −50 to about +10° C. The coatings produced from this coating composition may be characterized by enhanced elongation characteristics. This was unexpected. These coatings may comprise protective and/or decorative films, as well as caulks, sealants, and the like. These coatings may useful for coating masonry substrates, and the like.

DETAILED DESCRIPTION OF THE INVENTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "ionic unsaturated monomer" is used herein to refer to an unsaturated monomer composed of molecules containing ionic or ionizable groups, or both, irrespective of their nature, content, and location. Examples of such ionic unsaturated monomers include itaconic acid, acrylic acid, methacrylic acid, and the like.

The term "elastomer" is used herein to refer to a polymer or polymer blend, optionally combined with typical coating additives such as fillers, pigments, and the like, that when in the form of a film is capable of deforming in response to an applied stress by at least about 50% and returning to substantially its original shape after the applied stress is removed.

The term "wt %" means the number of parts by weight of ingredient per 100 parts by weight of the composition or material of which the ingredient forms a part.

The term "aqueous medium" refers to a composition containing a substantial amount of water. The aqueous medium may contain other ingredients as well.

The terms "film" or "coating" refer to three dimensional shapes that may be useful as protective and/or decorative barriers or layers. The film or coating may be characterized as having one relatively small dimension, e.g. thickness, and two relatively large dimensions, e.g., length and width, especially when formed using a coating process such as brushing, rolling, spraying, and the like. The terms film and coating may also refer to other thicker protective and/or decorative barriers or layers such as caulks, sealants, and the like.

The expression "( )" such as "(meth)", "(alk)", or "(alkyl)," is used to indicate that the particular substituent in a chemical name is optionally present but may be absent. For example, the term "(meth)acrylate" may be used to refer to either acrylate or methacrylate.

The term "copolymer" is used herein to refer to a polymer derived from two or more different monomers. The term copolymer may be used to refer to terpolymers.

The coating composition may comprise water at a concentration in the range from about 20 to about 80 wt %, or from about 25 to about 50 wt %. The water may be taken from any source. The water may comprise deionized water or distilled water. The water may comprise tap water.

The multivalent transition metal oxide, hydroxide and/or salt may comprise a zinc, aluminum, tin, tungsten and/or zirconium oxide, hydroxide and/or salt. Zinc oxide may be especially useful. The transition metal oxide, hydroxide and/or salt may be in the form of particulate solids. These solids may have an average particle size in the range from about 0.03 to about 2 microns, or from about 0.03 to about 1 micron, or from about 0.05 to about 0.2 micron. The transition metal oxide, hydroxide and/or salt may be present in the coating composition at a concentration in the range from about 0.25 to about 10 wt %, or from about 1.5 to about 5 wt %.

The multivalent transition metal oxide, anhydride and/or salt may generate multivalent transition metal ions when added to the inventive coating composition. This would normally be problematic in that the transition metal ions may tend to adversely affect the elongation characteristics of coatings formed from these coating compositions. However, while not wishing to be bound by theory, it is believed that the transition metal ions that may be generated when the multivalent transition metal oxide, hydroxide and/or salt is added to the inventive coating composition form complexes with the itaconic acid based repeating units used in the resin binder of these coating compositions. This may provide for the formation of coatings with enhanced elongation characteristics.

The zinc oxide may comprise any zinc oxide suitable for use in coatings, and the like. The zinc oxide may be useful as a fungistat for inhibiting the growth of mildew and mold. The zinc oxide may be in the form of pigment particulates. These particulates may have an average particle size in the range from about 0.03 to about 2 microns, or from about 0.03 to about 1 micron, or from about 0.05 to about 0.2 micron. The concentration of zinc oxide in the coating composition may be in the range from about 0.25 to about 10 wt %, or from about 1.5 to about 5 wt %. A commercial zinc oxide that may be used is available from Horsehead Corporation of Monaca, Pa., under the trade name Kadox 915.

The above-indicated polymer may be referred to as a resin binder. The polymer, which may be referred to as a copolymer, may comprise (a) from about 0.2 to about 3 wt %, or from about 0.2 to about 2.8 wt %, or from about 0.2 to about 2.5 wt %, or from about 0.25 to about 2.2 wt %, or from about 0.3 to about 2.0 wt %, based on the weight of the polymer of repeating units derived from itaconic acid; (b) from about 0 to about 2 wt %, or from about 0.5 to about 1.5 wt %, or from about 0.8 to about 1.2 wt %, based on the weight of the polymer of repeating units derived from acrylic acid; (c) from about 94.5 to about 99.5 wt %, or from about 95 to about 99.5 wt %, or from about 96 to about 99.5 wt %, or from about 97 to about 99.5 wt %, or from about 98 to about 99.5 wt %, or from about 99 to about 99.5 wt %, based on the weight of the polymer, of repeating units derived from one or more non-ionic mono-ethylenically unsaturated monomers; (d) from about 0 to about 5 wt %, or from about 0 to about 2 wt %, or from about 0 to about 1 wt %, based on the weight of the polymer of repeating units derived from one or more multi-ethylenically unsaturated monomers; and (e) from about 0 to about 2 wt %, or from about 0.01 to about 2 wt %, or from about 0.01 to about 1 wt %, or from about 0.01 to about 0.5 wt %, based on the weight of the polymer of repeating units derived from one or more anionic mono-ethylenically unsaturated monomers other than itaconic acid and acrylic acid.

The non-ionic mono-ethylenically unsaturated monomers used to provide the repeating units (c) of the polymer may include one or more acrylic acid esters, methacrylic acid esters, unsaturated nitriles, styrenic monomers, vinyl esters, vinyl ethers, conjugated dienes, olefins, halogenated monomers, allyl monomers, organosilanes, or a mixture of two or more thereof.

The acrylic acid esters and methacrylic acid esters that may be used to provide the repeating units (c) of the polymer may be represented by the following formula I:

wherein $R_1$ is hydrogen or a methyl group, and $R_2$ contains from 1 to about 100 carbon atoms, or from 1 to about 50, or from 1 to about 25 carbon atoms, and optionally, one or more sulfur, nitrogen, phosphorus, silicon, halogen and/or oxygen atoms. Examples may include (meth)acrylate esters, including methyl(meth)acrylate, ethyl(meth)acrylate, n-propyl (meth)acrylate, n-butyl(meth)acrylate, isopropyl(meth)acrylate, isobutyl(meth)acrylate, tert-butyl(meth)acrylate, n-amyl(meth)acrylate, n-hexyl(meth)acrylate, isoamyl (meth)acrylate, 2-hydroxyethyl(meth)acrylate, 2-hydroxypropyl(meth)acrylate, 4-hydroxybutyl(meth)acrylate, N,N-dimethylaminoethyl(meth)acrylate, N,N-diethylaminoethyl (meth)acrylate, t-butylaminoethyl(meth)acrylate, 2-sulfoethyl(meth)acrylate, trifluoroethyl(meth)acrylate, glycidyl(meth)acrylate, benzyl(meth)acrylate, allyl(meth) acrylate, 2-n-butoxyethyl(meth)acrylate, 2-chloroethyl (meth)acrylate, sec-butyl-(meth)acrylate, tert-butyl(meth) acrylate, 2-ethylbutyl(meth)acrylate, cinnamyl(meth) acrylate, crotyl(meth)acrylate, cyclohexyl(meth)acrylate, cyclopentyl(meth)acrylate, 2-ethoxyethyl(meth)acrylate, furfuryl(meth)acrylate, hexafluoroisopropyl(meth)acrylate, methallyl(meth)acrylate, 3-methoxybutyl(meth)acrylate, 2-methoxybutyl(meth)acrylate, 2-nitro-2-methylpropyl (meth)acrylate, n-octyl(meth)acrylate, 2-ethylhexyl(meth) acrylate, 2-phenoxyethyl(meth)acrylate, 2-phenylethyl (meth)acrylate, phenyl(meth)acrylate, propargyl(meth) acrylate, tetrahydrofurfuryl(meth)acrylate, norbornyl(meth) acrylate, acrylamide and its derivatives, and tetrahydropyranyl(meth)acrylate. Mixtures of acrylic and methacrylic acid esters may be used. The polymer may comprise a copolymer containing repeating units derived from one or more of the foregoing acrylic acid esters and/or methacrylic acid esters. The acrylic and/or methacrylic acid esters may be used to provide from about 0 to about 100 wt % of the repeating units (c) of the polymer, or from about 50 to about 100 wt %.

The unsaturated nitrile monomers that may be used to provide the repeating units (c) of the polymer may comprise acrylonitrile or alkyl derivatives thereof. The alkyl group may have from 1 to about 4 carbon atoms. These monomers may include acrylonitrile, methacrylonitrile, and the like. The monomers that may be used may include one or more unsaturated monomers containing one or more cyano groups such as those having the formula II:

wherein R is H or $C_nH_{2n+1}$ and n is 1 to about 4. Other examples of unsaturated nitrile monomers that may be used may include $CH_2=C(CN)_2$, $CH_3-CH=CH-CN$, $NC-CH=CH-CN$, 4-pentenenitrile, 3-methyl-4-pentenenitrile, 5-hexenenitrile, 4-vinyl-benzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile may be useful. The polymer may comprise a copolymer containing repeating units derived from one or more of the foregoing nitrile monomers. The unsaturated nitrile monomers may be used to provide from about 0 to about 25 wt % of the repeating units (c) of the polymer, or from about 0 to about 10 wt %.

The "styrenic monomers" that may be used to provide the repeating units (c) of the polymer may comprise monomers containing a carbon-carbon double bond in alpha-position to an aromatic ring. The styrenic monomers may be represented by one or more of the following formulae:

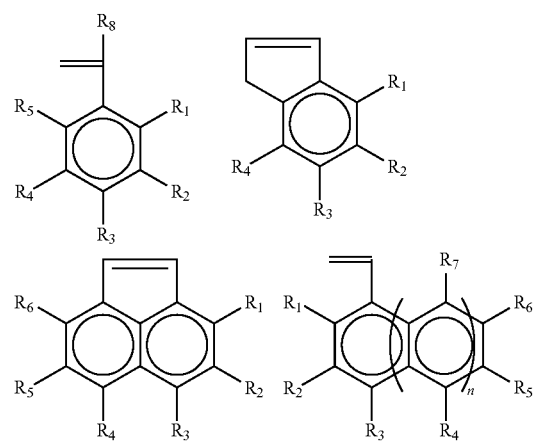

wherein n is an integer from 0 to about 2; $R_1$, $R_2$, $R_3$, $R_4$, $R_5$, $R_6$, and $R_7$ may independently be H, $CH_3$, $C_mH_{2m+1}$, OH, $OCH_3$, $OC_mH_{2m+1}$ COOH, $COOCH_3$, $COOC_mH_{2m+1}$, Cl or Br; m may be an integer from 2 to about 9; and $R_8$ may be H, $CH_3$, $C_mH_{2m+1}$, or $C_6H_5$.

Examples of the styrenic monomers that may be used may include styrene, alpha-methylstyrene, tertiary butylstyrene, ortho, meta, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinylnaphthalene, diverse vinyl(alkyl-naphthalenes) and vinyl(halonaphthalenes) and mixtures thereof, acenaphthylene, diphenylethylene, and vinyl anthracene. Mixtures of two or more styrenic monomers also may be used. The polymer may comprise a copolymer containing repeating units derived from one or more of the foregoing styrenic monomers. The styrenic monomers may be used to provide from about 0 to about 60 wt % of the repeating units (c) of the polymer, or from about 0 to about 30 wt %.

The vinyl ester monomers that may be used to provide the repeating units (c) of the polymer may be derived from carboxylic acids containing 1 to about 100, or 1 to about 50, or 1 to about 25 carbon atoms. These may include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, and the like, as well as mixtures of two or more thereof. The vinyl ester monomers may be used to provide from 0 wt % to about 50 wt % of the repeating units (c) of the polymer, or from about 0 wt % to about 30 wt %.

The vinyl ethers that may be used to provide the repeating units (c) of the polymer may include methyl-, ethyl-, butyl and/or iso-butyl vinyl ethers, and the like. The polymer may comprise a copolymer containing repeating units derived from one or more of the foregoing vinyl ether monomers. The vinyl ether monomers may be used to provide from 0 wt % to about 20 wt % of the repeating units (c) of the polymer, or from about 0 wt % to about 10 wt %, of the polymer.

The conjugated diene monomers that may be used to provide the repeating units (c) of the polymer may include one or more of those containing from about 4 to about 12 carbon atoms, or from about 4 to about 6 carbon atoms. Examples of the conjugated diene monomers that may be used may include butadiene, isoprene, cis-1,3-pentadiene, trans-1,3-pentadiene, cis-1,3-hexadiene, trans-1,3-hexadiene, 2-ethylbutadiene, 2-n-propylbutadiene, 2-i-propylbutadiene, 2-t-butylbutadiene, 2-amylbutadiene, 2-n-octylbutadiene, 4-methylpentadiene, cis-3-methylpentadiene, trans-3-methylpentadiene, cis-2-methylpentadiene, trans-2-methylpentadiene, 2,3-dimethylbutadiene, cis,cis-2,4-hexadiene, cis, trans-2,4-hexadiene, trans,trans-2,4-hexadiene, 2-methyl-3-ethylbutadiene, 2-methyl-3-i-propylbutadiene, 2-methyl-3-n-butylbutadiene, myrcene, cis-1-phenylbutadiene, trans-1-phenylbutadiene, 2-phenyl butadiene, 1,3-cyclopentadiene, 1,3-cyclohexadiene, 2-fluorobutadiene, 1-chlorobutadiene, 2-chlorobutadiene, 2,3-dichlorobutadiene, 2-bromobutadiene, sorbic acid, cis-1-cyanobutadiene, 2-methoxybutadiene, and like, as well as mixtures of two or more thereof. The conjugated diene monomers may be used to provide from about 0 wt % to about 20 wt % of the repeating units (c) of the polymer, or from 0 wt % to about 10 wt %.

One or more olefin monomers containing from 2 to about 100 carbon atoms, or from 2 to about 10 carbon atoms, may be used in providing the repeating units (c) of the polymer. Examples of such olefins may include ethylene, propylene, butylenes, isobutylene, hex-1-ene, oct-1-ene, and like, as well as mixtures thereof. Cyclic olefins may be used. These may include vinyl cyclohexane, cyclopentene, cyclohexene, cyclooctadiene, norbornene, norbornadiene, pinene, and the like, as well as mixtures of two or more thereof. The olefin monomers may be used to provide from about 0 wt % to about 30 wt % of the repeating units (c) of the polymer, or from about 0 wt % to about 20 wt %.

Apart from halogen-containing monomers mentioned above, one or more other halogen-containing monomers, that is, fluorine, chlorine, bromine, and/or iodine-containing monomers, may be used in providing the repeating units (c) of the polymer. These may contain from 2 to about 100 carbon atoms and at least one halogen atom. Examples of these monomers may include vinyl fluoride, vinyl chloride, vinyl bromide, vinylidene fluoride, vinylidene chloride, halogenated (meth)acrylic and styrenic monomers, allyl chloride and like, as well as mixtures of two or more thereof. These monomers may be used to provide from about 0 wt % to about 60 wt % of the repeating units (c) of the polymer, or from about 0 wt % to about 30 wt %.

Another group of monomers that may be used in providing the repeating units (c) of the polymer may include one or more polar monomers. These may include one or more hydroxyalkyl(meth)acrylates, (meth)acrylamides and substituted (meth)acrylamides, sodium styrene sulfonate and sodium vinyl sulfonate, N-vinyl-2-pyrrolidone, N-vinyl caprolactam, 2-hydroxyethyl(meth)acrylate, 2-hydroxypropyl(meth)acrylate, 4-hydroxybutyl(meth)acrylate, (4-hydroxymethylcyclohexyl)-methyl(meth)acrylate, acrolein, diacetone(meth)acrylamide, 1-(2-((2-hydroxy-3-(2-propenyloxy)propyl)amino)ethyl)-2-imidazolidinone, N-methylol (meth)acrylamide, diallyl phthalate, Sipomer® WAM and WAM II (from Rhodia), dimethylaminoethyl(meth)acrylate, and/or dimethylaminopropyl(meth)acrylamide. Mixtures of two or more polar monomers may be used. The polar monomers may be used to provide from about 0 to about 10 wt % of the repeating units (c) of the polymer, or from about 0 to about 5 wt %.

The organosilanes that may be used to provide the repeating units (c) of the polymer may include gamma-aminopropyltrialkoxysilanes, gamma-isocyanatopropyltriethoxysilane, vinyl-trialkoxysilanes, glycidoxypropyltrialkoxysilanes, ureidopropyltrialkoxysilanes, and mixtures of two or more thereof. The organosilanes may include A-187 gamma-glycidoxy-propyltrimethoxysilane, A-174 gamma-methacryloxypropyltrimethoxysilane, A-1100 gamma-aminopropyltriethoxysilane silane coupling agents, A-1108 amino silane coupling agent and A-1160 gamma-ureidopropyltriethoxysilane (each of which is commercially available from CK Witco Corporation of Tarrytown, N.Y.). The organosilanes may be at least partially hydrolyzed with water. The organosilanes may be used to provide from about 0 to about 5 wt % of the repeating units (c) of the polymer, or from about 0 to about 3 wt %, or from about 0 to about 1 wt %.

The multi-ethylenically unsaturated monomers that may be used to provide the repeating units (d) of the polymer may include one or more allyl methacrylate, diallyl phthalate, 1,4-butylene glycol dimethacrylate, 1,6-hexanediol diacrylate, mixtures of two or more thereof, and the like. These monomers may be used at a level in the range from about 0 to about 5 wt % based on the weight of the polymer, or from about 0 to about 2 wt %, or from 0 to about 1 wt %.

The anionic mono-ethylenically unsaturated monomers other than itaconic acid and acrylic acid that may be used to provide repeating units (e) of the polymer may include monomers with acid functional groups or salts thereof. These may include monomers of which the acid groups are latent as, for example, in maleic anhydride. The acid functional groups may include carboxylic acid groups, phosphorus acid groups, sulfur acid groups, or a mixture of two or more thereof. These monomers may include oligomerized acrylic acids such as .beta.-carboxyethyl acrylate or its higher analogues (commercially available from Rhodia as Sipomer™ B-CEA), fumaric acid, maleic acid, citraconic acid, or the anhydrides thereof, phosphoethyl(meth)acrylate, allyl phosphonic acid, styrene p-sulphonic acid, ethylmethacrylate-2-sulfonic acid, 2-acrylamido-2-methylpropane sulfonic acid, 1-allyloxy-2- hydroylpropyl sulfonic acid, vinyl sulfonic acid, (e.g., sodium or potassium) or a mixture of two or more thereof. The acid bearing monomer may be polymerized as the free acid or as a salt, e.g. the $NH_4$ or alkali metal salts.

The polymer may have a glass transition temperature in the range from about −50° C. or about −40° C. to about +10° C., or from about −40° C. to about 0° C. or about 10° C.

The polymer may be in the form of particles with an average particle size in the range from about 100 to about 700 nanometers (nm), or from about 200 to about 500 nm, as measured using a Brookhaven BI-90 Particle Sizer, which employs a light scattering technique, or a Nicomp 380. Polymodal particle size distributions may be employed.

The polymer may present in the coating composition at a concentration in the range from about 10 to about 70 wt %, or from about 20 to about 40 wt %. The final coating after being applied to a substrate and dried or cured may contain from about 20 to about 70 wt % of the polymer, or from about 20 to about 40 wt %.

The polymer may be made using any polymerization process. Emulsion polymerization may be used. The monomers may be emulsified with an anionic or nonionic surfactant or dispersing agent, or compatible mixtures thereof, such as a mixture of an anionic and a nonionic surfactant, using, for example, from about 0.05 wt % to about 5 wt % of a surfactant or dispersing agent based on the weight of the monomer. The anionic dispersing agents may include, for example, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium t-octylphenoxypolyethoxyethyl sulfate, having from 1 to about 5 oxyethylene units, and the like. The non-ionic dispersing agents may include, for example, alkyl phenoxypolyethoxy ethanols having alkyl groups of from about 7 to about 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from about 6 to about 60 oxyethylene units; ethylene oxide condensates of long chained alcohols such as octyl, decyl, lauryl, or cetyl alcohols containing from about 6 to about 60 oxyethylene units; ethylene oxide condensates of long-chain or branched chain amines such as dodecyl amine, hexadecyl amine, and octadecyl amine, containing from about 6 to about 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

Initiation of the polymerization process may be carried out by the thermal decomposition of free radical precursors which are capable of generating radicals suitable for initiating addition polymerization such as, for example, ammonium or potassium persulfate, azo initiators such as azobisisobutyronitrile (AIBN), alkyl peroxydicarbonates, etc. Alternatively, such free radical precursors may be used as the oxidizing component of a redox system, which may also include a reducing component such as alkali metal (e.g., potassium) metabisulfite, alkali metal (e.g., sodium) thiosulfate, or alkali metal (e.g., sodium) formaldehyde sulfoxylate. The free radical precursor and reducing agent together, referred to as a redox system herein, may be used at a level of from about 0.01 wt % to about 5 wt %, based on the weight of monomers.

Examples of redox systems that may be used may include t-butyl hydroperoxide/sodium formaldehyde sulfoxylate/Fe (III) and ammonium persulfate/sodium bisulfite/sodium hydrosulfite/Fe(III). The polymerization temperature may be in the range from about 20° C. to about 95° C.

The polymerization may be initiated in the presence of a small particle size preformed emulsion polymer (e.g., seed polymerization), or unseeded. Seeded polymerization may yield an aqueous dispersions of latex polymer having more uniform particle size than unseeded polymerization.

Chain transfer agents may be used to control molecular weight and include mercaptans, polymercaptans, alcohols, and halogen compounds used in the polymerization mixture in order to moderate the molecular weight of the polymeric binder. Generally, from 0% to about 3% by weight, based on the weight of the polymeric binder, of $C_4$-$C_{20}$ alkyl mercaptans, mercaptopropionic acid, or esters of mercaptopropionic acid, may be used.

The polymerization process may comprise a batch process, continuous process, staged process, or a process involving any other method. Each stage of a staged process may incorporate thermal or redox initiation of polymerization. A monomer emulsion containing all or some portion of the monomers to be polymerized in a given stage may be prepared using the monomers, water, and emulsifiers. A solution of initiator in water may be separately prepared. The monomer emulsion and initiator solution may be co-fed into the polymerization vessel over the course of the emulsion polymerization of any stage of the process. The reaction vessel itself may also initially contain seed emulsion and further may additionally contain an initial charge of polymerization initiator. The temperature of the contents of the reaction vessel may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the monomer emulsions are co-fed may be altered during the emulsion polymerization process. After addition of the first monomer emulsion(s) has been completed, the polymerization reaction mixture may be held at some temperature for a time and/or treated with a polymerization inhibitor prior to polymerization of the subsequent monomer emulsion(s). Similarly, after addition of the final monomer emulsion(s) has been completed, the polymerization reaction mixture may be held at some temperature for a time and/or treated with a polymerization inhibitor before cooling to ambient temperature.

The polymer may be combined with other commercial polymers or polymer dispersions by methods known to those skilled in the art. The polymer may be used for forming hybrids with other polymers such as urethanes or silicones. This may be done by polymerizing additional monomers by emulsion or suspension polymerization in the presence of the polymer, blending the polymer with other preformed polymers, or synthesizing the polymer in the presence of other polymers.

Adjuvants useful in the preparation of the polymer and/or in its subsequent use may be added during or subsequent to the polymerization reaction. These may include auxiliary surfactants; defoamers such as, for example, SURFYNOL 104E and Nopco NXZ used at a level from about 0.001 to about 0.1 wt % based on the weight of the monomer mixture; leveling agents such as, for example, Sag® Silicone Antifoam 47 used at a level from about 0.001 to about 0.1 wt % based on the weight of the monomer mixture; antioxidants such as, for example, MAROXOL 20 and IRGANOX 1010 used at a level from about 0.1 to about 5 wt % based on the weight of the monomer mixture; plasticizers such as, for example, FLEXOL® plasticizer; and preservatives such as, for example, KATHON® at a level of about 30 to about 45 parts per million (ppm), or PROXEL® GXL at a level of about 300 to about 500 ppm.

The coating composition may comprise water, zinc oxide, the foregoing polymer (or resin binder) and, optionally, one or more coupling agents such as organosilane coupling agents, transition metal coupling agents, phosphonate coupling agents, aluminum coupling agents, amino-containing Werner coupling agents, or a mixture of two or more thereof. These coupling agents may have dual functionality. Each metal or silicon atom may have attached to it one or more groups which can either react with or compatibilize an inorganic or metal oxide surface and/or the components of the coating/binder. As used herein, the term "compatibilize" means that the groups are, chemically attracted, but not bonded, to components of the coating composition, for example by polar, wetting or solvation forces. The metal or silicon atom may have attached to it one or more hydrolyzable groups that may allow the coupling agent to react with an inorganic surface, and one or more functional groups that may allow the coupling agent to react with the coating or resin binder. Examples of hydrolyzable groups may include the monohydroxy and/or cyclic $C_2$-$C_3$ residue of a 1,2- or 1,3 glycol. Examples of suitable compatibilizing or functional groups that may be used may include epoxy, glycidoxy, mercapto, cyano, allyl, alkyl, urethano, carbamate, halo, isocyanato, ureido, imidazolinyl, vinyl, acrylato, methacrylato, amino and/or polyamino groups.

The polymer may be used as a binder in coatings, adhesives, films, and the like, for porous and non-porous substrates such as: masonry, as well as paper, non-woven materials, textiles, wood, metals, plastics (e.g., polypropylene, polyester, polyurethane), house wrap and other building materials, fiberglass, polymeric articles, roofs, and the like. The coating compositions may be applied by any conventional method including brushing, rolling, dipping, flow coating, spraying, and the like.

Other additives well known to those skilled in the art may be used to aid in preparation of the coatings of this invention. Alternatively, one or more of these additives may be added to the reaction mixture used to synthesize the polymer. These additives may include stabilizers, defoamers, antioxidants (e.g., Irganox 1010), UV absorbers, carbodiimides, activators, curing agents, stabilizers such as carbodiimide, colorants, pigments, neutralizing agents, rheology modifiers (thickeners), non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, coalescents, salts, flame retardant additives (e.g., antimony oxide), dispersants, extenders, surfactants, wetting agents, plasticizers, waxes, antiozonants, and the like. They can optionally be added as appropriate before and/or during the processing of the polymer of this invention into finished products as is well known to those skilled in the art. They can be used in amounts as generally known in the art. Additives may also be used as appropriate in order to make articles or to treat other products (such as by impregnation, saturation, spraying, coating, or the like).

The coating composition, after being applied to a substrate and dried or cured, may comprise an elastomeric composition. This elastomeric composition may be useful in providing protective and/or decorative coatings, films, caulks, sealants, and the like, where coating flexibility and dirt pick-up resistance may be advantageous.

The photosensitive additives may be in the form of a composition containing a grouping capable of absorbing a portion of the solar light spectrum, e.g., activated by U.V. light. The photosensitive composition may comprise a photosensitive compound added to the polymer or to the elastomeric composition in the manner of an additive, or it may be a photosensitive oligomer or photosensitive polymer, or it may be a photosensitive grouping chemically incorporated into the emulsion polymer such as, for example, by copolymerization. The photosensitive compounds may include benzophenone derivatives used at a level of from about 0.01 to about 2 wt % or about 5 wt %, or from about 0.01 wt % or about 0.05 wt % to about 0.5 wt %, or about 1 wt % or about 2 wt %, or from about 0.05 wt % or about 1 wt % based on the weight of the polymer, wherein one or both of the phenyl rings may be substituted such as, for example, benzophenone, 4-methyl benzophenone, 4-hydroxy benzophenone, 4-amino benzophenone, 4-chloro benzophenone, 4-hydrocarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones, and the like. More preferred is benzophenone or a 4-substituted (para-) benzophenone. Benzophenone itself is most preferred. Photosensitive groupings capable of being chemically incorporated may be present as copolymerized ethylenically unsaturated monomers which may be used at a level of about 0.5 to about 5 wt % based on weight of the polymer, such as are disclosed in U.S. Pat. Nos. 3,429,852; 3,574,617; and 4,148,987. Additionally, allyl benzoylbenzoates and copolymerizable monomers incorporating pendant benzophenone radicals may be used.

The coatings may contain, in addition to zinc oxide, any other desirable pigments or dyes. The pigments may have an average particle size in the range from about 0.05 to about 5 microns, or from about 0.2 to about 1.5 microns. The pigment may comprise any natural or synthetic, inorganic or organic, insoluble, particles which, when dispersed in the coating provide color and opacity, and, optionally, also hardness, durability, and the like. The distinction between pigments and dyes is that the pigments are insoluble and dispersed in the coating, while dyes, if used, are soluble in the coating composition. The pigment may comprise one or more: cadmium pigments such as cadmium yellow, cadmium red, cadmium green, cadmium orange; carbon pigments such as carbon black (including vine black and lamp black), ivory black (bone char); chromium pigments such as chrome yellow and chrome green; cobalt pigments such as cobalt violet, cobalt blue, cerulean blue, aureolin (cobalt yellow); copper pigments such as Han purple, Egyptian blue, Paris green, verdigris and viridant; iron oxide pigments such as sanguine, caput mortuum, oxide red, red ochre, Venetian red and Prussian blue; clay earth pigments (iron oxides) such as yellow ochre, raw sienna, burnt sienna, raw umber and burnt umber; lead pigments such as lead white, cermintz white, Naples yellow and red lead; mercury pigments such as vermilion; titanium pigments such as titanium yellow, titanium beige, titanium white and titanium black; ultramarine pigments such as ultramarine and ultramarine green shade; zinc pigments such as zinc white and zinc ferrite; organic pigments such as alizarin (synthesized), alizarin crimson (synthesized), gamboges, cochineal red, rose madder, indigo, Indian yellow, Tyrian purple, quinacridone, magenta, phthalo green, phthalo blue, pigment red 170; or a mixture of two or more thereof. The pigment or dye may comprise from about 0 wt % to about 15 wt % of the coating composition, or from about 0.01 wt % to about 15 wt %.

The coating composition may contain one or more extender pigments. These may be referred to as filler pigments or matting pigments. The extender pigments may have an average particle size in the range from about 0.05 to about 100 microns, or from about 1 to about 50 microns. The one or more extender pigments may comprise any natural or synthetic, inorganic or organic, insoluble, particles which, when dispersed in the coating composition may provide matting and, optionally, impart hardness, durability, and the like, to the coatings formed from the coating composition. The extender pigments may be used to modify the viscosity of the coating composition, enhance the sedimentation stability of the coating composition, and/or increase the film strength of the coatings formed from the coating composition. The extender pigments may be used to enhance the mechanical, thermal and/or barrier properties of the coatings. The extender pigments may be used to reduce the cost of the coating composition. Examples of the extender pigments that may be used may include calcium carbonate, clay, mica, feldspar, aluminum silicate, magnesium silicate, silica, barium sulfate, and the like, or a mixture of two or more thereof. The coating composition may contain from 0 to about 70 wt % of one or more extender pigments, or from about 20 to about 50 wt %.

The coatings, as well as caulks and sealants of this invention, may be prepared by mixing the polymer with conventional components in high speed dispersion equipment such as a Cowles disperser or a Sigma mill. The coatings may be applied to a wide variety of architectural construction materials such as, for example, masonry, wood, concrete, metal, glass, ceramics, plastics, plaster, stucco, and roofing substrates such as asphaltic coatings, roofing felts, synthetic polymer membranes, and foamed polyurethane insulation; or to previously painted, primed, undercoated, worn, or weathered substrates.

The coatings (i.e., films, caulks, sealants, and the like) of this invention may be applied by a variety of techniques well known in the art such as, for example, air-assisted or airless spray, electrostatic spray, brush, rollers, mops, caulking guns, trowels, and the like.

The coating composition may be applied to any substrate, particularly architectural materials and masonry where appearance, crack bridging, and durability is a concern. Masonry to which the coating compositions may be applied includes brick, miscellaneous masonry, concrete, blends of concrete or mortar and aggregate, stone, tile and stucco. The term "masonry" is used herein to refer to any substantially inorganic substrate, particularly building compositions and includes, but is not limited to, structural materials such as common brick, paving brick, face brick, drain tile, hollow block, cinder block, glazed brick or tile, terra cotta, conduits, roofing tile, ceramic tile, flue lining, mortar, cements such as Portland cement, gypsum products (optionally calcined) (e.g., molding, building plaster and stucco), marble, limestone, magnesia cement, and insulation products such as electrical and thermal insulators (diatomaceous earth brick). The coating composition may also be applied as roof coatings and in other exterior applications where resistance to UV light exposure and protection from moisture/water is important even though the substrate may have surface cracks or cracks within or between different substrates.

The preparation of the polymers of the invention is exemplified in the following Examples 1 to 8. For purposes of comparison, the polymers disclosed in Comparative Examples C-1 to C-10 are also disclosed. In the following examples, unless otherwise indicated, all parts and percentages are by weight.

Example 1

A seed polymer is prepared as follows. A monomer premix is made by mixing 329 grams of water, 2.33 grams of 30% sodium lauryl sulfate in water, 0.7 grams of ammonium bicarbonate, 16.33 grams of Dextrol OC-60 (tridecyl ethoxylated phosphate supplied by Ashland Aqualon), 245 grams of 2-ethylhexyl acrylate, 434 grams of methyl methacrylate, and 21 grams of methacrylic acid. Initiator A is made by dissolving 0.7 grams of ammonium persulfate in 35 grams of water. Initiator B is made by dissolving 1.05 grams of ammonium persulfate in 84 grams of water. 770 grams of water, 0.24 grams of ammonium bicarbonate, and 62.22 grams of Dowfax 2A1 (anionic surfactant from Dow identified as an alkyldiphenyloxide disulfonate) are charged to a 3-liter reaction vessel and heated to 80° C. under a nitrogen blanket. Initiator A is then added to the reaction vessel, followed by proportioning the monomer premix to the reaction vessel over a period of about 3 hours. 45 minutes after premix proportioning starts, Initiator B is proportioned into the reaction vessel over a period of about 3 hours. After completion of initiator B feed, the temperature of the reaction vessel is maintained at 80° C. for 90 minutes. The reaction vessel is then cooled to 57° C. 3.29 grams of 17% aqueous solution of t-butyl hydroperoxide and 36.1 grams of 2.77% erythorbic acid solution are added to the reaction vessel about 5 minutes apart. After 30 minutes, the reaction vessel is cooled to room temperature and filtered through 100-micron cloth. The pH of the resulting emulsion is adjusted to 8.5-9.0 with ammonium hydroxide. 19.33 grams of 3% Proxel GXL solution (microbiostat solution from Arch Chemicals identified as containing 1,2-benzisothiazolin-3-one) are added as a preservative.

Example 2

An emulsion polymer is made using a monomer composition which contains IA/2-EHA/styrene/AN//styrene at a weight ratio of 2/73.4/16.6/5//3. The following procedure is used. A monomer premix is prepared. The monomer premix contains 20 grams of itaconic acid (IA), 270 grams of water, 1 gram of ammonium carbonate, 10 grams of Rhodapex EST-30 (sodium salt of tridecyl ether sulfate), 734 grams of 2-ethylhexyl acrylate (2-EHA), 106 grams of styrene, and 50 grams of acrylonitrile (AN). Initiator A is made by dissolving 1.5 grams of ammonium persulfate in 50 grams of water. Initiator B is made by dissolving 2.5 grams of ammonium persulfate in 80 grams of water. 270 grams of water, 1 gram of ammonium carbonate, and 17 grams of the seed polymer from Example 1 are charged to a 3-liter reaction vessel and heated to 78° C. under a nitrogen blanket. Initiator A was then added to the reaction vessel, followed by proportioning the monomer premix to the reaction vessel over a period of about 4 hours. 45 minutes after premix proportioning, initiator B is proportioned into the reaction vessel over a period of about 4 hours and 30 minutes. After completion of the premix proportioning, 30 grams of styrene with 38 grams of water are proportioned into the reaction vessel followed by 30 grams of water flush. After completion of the initiator B feed, the temperature of the reaction vessel is raised to 82° C. for 30 minutes. The reaction vessel is then cooled to 57° C. A mixture of 20 grams of water, 5 grams of 70% t-butyl hydroperoxide, and 0.67 gram of 30% ammonium lauryl sulfate is added into the reaction vessel. After about 5 minutes, a solution of 3 grams of Bruggolite FF-6 (product of Bruggeman Chemical identified as derivative of sulfinic acid useful as a catalyst for emulsion polymerization processes) in 40 grams of water is proportionated into to the reaction vessel for 60 minutes. After 30 minutes, the reaction vessel is cooled to room temperature and filtered through 100-micron cloth. The pH of the product is adjusted to about 8.5 with ammonium hydroxide. 5.33 grams of Acticide MV (biocide supplied by Thor Group) are added as a preservative.

Example 3

An emulsion polymer is made using the procedure described in Example 2 except that the monomer composition contains IA/2-EHA/styrene/AN/AA//styrene at a weight ratio of 1/74.2/16.8/5/1//3. AA is acrylic acid.

Example 4

A emulsion polymer is made using the procedure described in Example 2 except that the monomer composition contains IA/2-EHA/styrene/AN//styrene at a weight ratio of 2/62.1/27.9/5//3.

Example 5

An emulsion polymer is made using the procedure described in Example 2 except that the monomer composition contains IA/2-EHA/styrene/AN/AA//styrene at a weight ratio of 1/62.9/28.1/5/1//3

Example 6

An emulsion polymer is made using a monomer composition which contains styrene/BA/acrylamide/AA//BA at a weight ratio of 38.6/3.6/1/0.5//56. The following procedure is used. 0.32 phm (parts by weight per 100 parts by weight of free radically polymerizable monomers in the formulation) of itaconic acid is charged to a five-liter reaction vessel. A monomer premix is made by mixing 380 grams of water, 55.6 grams of Polystep TSP-16S (a sodium salt of tristrylphenol ethoxylate sulfate supplied by Stepan), 20 grams of Abex JKB (anionic surfactant supplied by Rhodia), 11.4 grams of ammonium hydroxide, 772 grams of styrene, 71.6 grams of n-butyl acrylate (BA), 38.5 grams of 52% acrylamide solution, and 10 grams of acrylic acid. Initiator A is made by mixing 6.2 grams of potassium persulfate in 20 grams of water. Initiator B is made by dissolving 7.2 grams of ammonium persulfate in 160 grams of water. 700 grams of water, 6.4 grams of itaconic acid, 13.3 grams of Abex JKB, and 20 grams of Makon TSP-16 (surfactant supplied by Stepan identified as tristyrylphenol ethoxylate) are charged to the reaction vessel and heated to 82° C. under a nitrogen blanket. Initiator A is then added to the reaction vessel followed by 20 grams of water flush, followed by proportioning the monomer premix to the reaction vessel. The reaction temperature is held at 87° C. At 30 minutes after premix proportioning, initiator B is proportioned into the reaction vessel over a period of about 4 hours and 30 minutes. At 45 minutes after premix proportioning, 1120 grams of n-butyl acrylate and 80 grams of water are added to the premix. The total premix proportioning time is about 4 hours. After completion of initiator B feed, the temperature of the reaction vessel is maintained at 84° C. for 30 minutes. The reaction vessel is then cooled to 57° C. A solution of 2 grams of BruggoliteFF-6 in 29 grams of water is added to the reaction vessel. After about 5 minutes, a mixture of 9.2 grams of water, 4.3 grams of 70% t-butyl hydroperoxide, and 0.4 grams of 30% ammonium lauryl sulfate is added into the reaction vessel. After 30 minutes, the above redox addition is repeated. The reaction vessel is then cooled to room temperature, and the vessel contents are filtered through 100-micron cloth. The pH of the product was adjusted to about 8.5 with ammonium hydroxide. 8 grams of Acticide MV are added as a preservative.

Example 7

An emulsion polymer is made using a monomer composition which contains: styrene/BA/acrylamide/AA//BA at a weight ratio of 38.6/3.6/1/0.5//56. 0.32 phm of itaconic acid is charged to the reaction vessel. The polymer is made using the same procedure described in Example 6 except that the second addition of BA is made at 35 minutes.

Example 8

An emulsion polymer is made using the following monomer composition: IA/styrene/BA/acrylamide/AN/BA at a weight ratio of 0.332/38.6/3.0/1.4/0.37//56. The polymer is made with 0.332 phm of itaconic acid in the monomer premix but not in the reaction vessel.

Comparative Example C-1

An emulsion polymer is made using the procedure described in Example 2 except that the monomer composition contains IA/2-EHA/styrene/AN/MAA//styrene at a weight ratio of 1/73.8/16.2/5/1//3. MAA is methacrylic acid.

Comparative Example C-2

An emulsion polymer is made using the procedure described in Example 2 but without itaconic acid. The monomer composition contains 2-EHA/styrene/AN/AA//styrene at a weight ratio of 75/17/5/2//3.

Comparative Example C-3

An emulsion polymer is made using the procedure described in Example 2 except that the monomer composition contains IA/2-EHA/styrene/AN/MAA//styrene at a weight ratio of 1/52.5/27.5/5/1//3.

Comparative Example C-4

An emulsion polymer is made using the procedure described in Example 2 but without itaconic acid. The monomer composition contains 2-EHA/styrene/AN/AA//styrene at a weight ratio of 63.7/28.3/5/2//3

Comparative Example C-5

An emulsion polymer is made using the procedure described in Example 2 but without itaconic acid. The monomer composition contains 2-EHA/styrene/AN/MAA//styrene at a weight ratio of 62.9/27/5/2//3

Comparative Example C-6

An emulsion polymer is made using the procedure described in Example 2 except that the monomer composition contains IA/2-EHA/styrene/AN/AA//styrene at a weight ratio of 0.5/63.6/27.9/5/2//3

Comparative Example C-7

An emulsion polymer is made using the procedure described in Example 2 except that the monomer composition contains IA/2-EHA/styrene/AN/MAA//styrene at a weight ratio of 0.5/62.9/26.7/5/2//3.

Comparative Example C-8

An emulsion polymer is made using a monomer composition which contains: styrene/BA/acrylamide/AA//BA at a weight ratio of 38.6/3.9/1/0.5//56. The procedure that is used is the same as described in Example 6 except that no itaconic acid is used.

Comparative Example C-9

An emulsion polymer is made using a monomer composition which contains: styrene/BA/acrylamide/AA//BA at a weight ratio of 38.6/3.6/1/0.5//56. The polymer is made using the procedure described in Example 7 but without itaconic acid.

Comparative Example C-10

An emulsion polymer is made using a monomer composition containing styrene/BA/acrylamide/AA//BA at a weight ratio of 38.6/3.0/1.4/0.7//56. The polymer is made using the procedure described in Example 8 except that no itaconic acid is used.

The polymers prepared in accordance with Examples 2-8 and Comparative Examples C-1 to C-10 are each blended into the coating composition shown in Table 1. The same concentration for each polymer is used.

TABLE 1

| | lb/100 gal | wt % |
|---|---|---|
| Grind | | |
| Water | 140.0 | 11.83 |
| KTPP (potassium dispersant) | 1.0 | 0.08 |
| Kadox 915 (zinc oxide) | 25.0 | 2.11 |
| Optiflo H370 VF (thickener) | 1.5 | 0.13 |
| Carbosperse K7600N (34% dispersant) | 22.46 | 1.9 |
| Ammonia Solution 28% | 0.5 | 0.04 |
| Triton CF10 (surfactant) | 6.0 | 0.51 |
| Drewplus L475 (defoamer) | 2.0 | 0.17 |
| Acticide MBS (biocide) | 2.0 | 0.17 |
| Ti-Pure R-706 (titanium dioxide) | 146.0 | 12.34 |
| Huber 35 (clay) | 146.0 | 12.34 |
| Duramite (calcium carbonate) | 146.0 | 12.34 |
| Mica 3 (mica) | 46.0 | 3.89 |
| Sodium omadine (mildewcide) | 5.0 | 0.42 |
| Water | 25.0 | 2.11 |
| Total Grind | 714.46 | |
| Letdown | | |
| Emulsion polymer from Examples 2 to 8 or C-1 to C-10 | 430 | 36.34 |
| Water | 28.46 | 2.40 |
| Drewplus L475 (defoamer) | 4.0 | 0.34 |
| Grind | 714.46 | 60.37 |
| Optiflo H370 VF (thickener) | 1.5 | 0.13 |
| Drewplus L475 (defoamer) | 3.0 | 0.25 |
| Ammonia Solution 28% | 2.0 | 0.17 |
| Total | 1183.42 | 100 |

Each of the coating compositions is prepared by initially preparing the Grind. The Grind is prepared by adding the water, KTPP and Kadox 915 to a mixing vessel and mixing with a Cowles mixing blade at low speed for 20 minutes. The Optiflo H370 VF, Carbosperse K7600N, 26% ammonia, Triton CF10, Drewplus L475 and Acticide MBS are then added in that order. The Ti-Pure R-706, Huber 35, Duramite and Mica 3 are then added. The vessel contents are mixed at high speed for 20 minutes to provide a 6 Hegman grind. The sodium omadine is then added.

The emulsion polymer from each of the examples, water and Drewplus L475 are added to a letdown tank. The Grind is pumped to the letdown tank. The Optiflo H370 VF is added. The letdown tank contents are mixed with a paddle blade for 20 minutes. The Drewplus L475 is added followed by the ammonia. The letdown tank contents are mixed for 5-10 minutes. The letdown tank contents, which consists of the desired coating compositions, are then poured into paint cans.

The coating compositions each have the following properties:

| | |
|---|---|
| Pounds/gallon | 11.83 |
| Specific gravity | 1.42 |
| Weight Solids, % | 65.24 |
| Volume Solids, % | 50.14 |
| Simple pigment volume concentration (PVC), % | 42.06 |
| Complex PVC, % | 40.22 |
| Volatile organic compounds (VOC) grams/liter | 0.12 |

The coating compositions are tested for tensile strength and elongation. Each coating composition is applied to a polyethylene sheet using a 25 mil film applicator. The film is dried and tested for tensile strength and elongation using test method ASTM D 638-08. Samples of the dried film are soaked in deionized water to measure water absorption. The coatings are tested for dirt pick-up resistance by applying each coating to a substrate, drying the coating, applying a dirt solution to the coating, drying the dirt solution, washing the coating, and determining the percent of reflectance retained after washing. The results are shown in Tables 2 and 3. The monomer composition used to produce each polymer is also shown in Tables 2 and 3. The polymers shown in Table 2 are non-staged polymers. The polymers shown in Table 3 are staged polymers. The term "non-staged polymer" refers to the fact that no changes are made in the monomer composition after polymerization is commenced. The term "staged polymer" refers to the fact that the monomer composition undergoes a change during polymerization.

TABLE 2

| Monomer composition/ | Example | | | | | | | | | | |
|---|---|---|---|---|---|---|---|---|---|---|---|
| Test Results | 2 | 3 | 4 | 5 | C-1 | C-2 | C-3 | C-4 | C-5 | C-6 | C-7 |
| Itaconic acid (phm) | 2.0 | 1.0 | 2.0 | 1.0 | 1.0 | 0 | 1.0 | 0 | 0 | 0.5 | 0.5 |

TABLE 2-continued

| Monomer composition/ Test Results | Example | | | | | | | | | | |
|---|---|---|---|---|---|---|---|---|---|---|---|
| | 2 | 3 | 4 | 5 | C-1 | C-2 | C-3 | C-4 | C-5 | C-6 | C-7 |
| Acrylic Acid (phm) | 0 | 1.0 | 0 | 1.0 | 0 | 2.0 | 0 | 2.0 | 0 | 2.0 | 0 |
| Methacrylic acid (phm) | 0 | 0 | 0 | 0 | 1.0 | 0 | 1.0 | 0 | 2.0 | 0 | 2.0 |
| Styrene (phm) | 19.6 | 19.8 | 30.9 | 31.1 | 19.2 | 20.0 | 30.5 | 31.3 | 30.05 | 30.9 | 29.7 |
| Acrylonitrile (phm) | 5.0 | 5.0 | 5.0 | 5.0 | 5.0 | 5.0 | 5.0 | 5.0 | 5.0 | 5.0 | 5.0 |
| 2-ethylhexyl acrylate (phm) | 73.4 | 74.2 | 62.1 | 62.9 | 73.8 | 75.0 | 62.5 | 63.7 | 63.0 | 63.6 | 62.9 |
| Tensile strength (psi) | 292.7 | 322.3 | 378.7 | 404.7 | 362.1 | 393.2 | 460.8 | 500.6 | 483.9 | 544.8 | 610.1 |
| Elongation, % | 127.8 | 160.4 | 138.9 | 122.7 | 91.8 | 98.0 | 64.6 | 84.6 | 76.4 | 81.4 | 55.7 |
| Water Absorption, % | 18.4 | 18.7 | 18.3 | 18.2 | 19.2 | 21.3 | 18.6 | 25.6 | 20.6 | 17.4 | 21.3 |
| Dirt Resistance (%) | 80.3 | 72.0 | 80.5 | 74.1 | 79.9 | 73.8 | 83.7 | 71.7 | 82.9 | 74.8 | 78.7 |

The results in Table 2 indicate significant improvements in elongation with Examples 2 to 5, as compared to Examples C-1 to C-7.

TABLE 3

| Monomer Composition/ Test Results | Example | | | | | |
|---|---|---|---|---|---|---|
| | 6 | 7 | 8 | C-8 | C-9 | C-10 |
| Itaconic acid, premix (phm) | 0 | 0 | 0.332 | 0 | 0 | 0 |
| Acrylic Acid (phm) | 0.50 | 0.50 | 0.37 | 0.50 | 0.50 | 0.70 |
| Itaconic acid, reactor (phm) | 0.32 | 0.32 | 0 | 0 | 0 | 0 |
| Acrylamide (phm) | 1.0 | 1.0 | 1.4 | 1.0 | 1.0 | 1.4 |
| Styrene (phm) | 38.6 | 38.6 | 38.6 | 38.6 | 38.6 | 38.6 |
| n-butyl acrylate, 1st staged (phm) | 3.6 | 3.6 | 3.0 | 3.9 | 3.6 | 3.0 |
| n-butyl acrylate, 2nd staged (phm) | 56.0 | 56.0 | 56.0 | 56 | 56 | 56 |
| Stage Time (min) | 45 | 35 | 35 | 45 | 35 | 35 |
| Elongation (%) | 202 | 294 | 314 | 113 | 100 | 159 |
| Water Absorption (%) | 9.9 | 9.3 | 11.0 | 14.6 | 10.5 | 9.9 |
| Dirt Resistance (%) | 90 | 85 | 95 | 75 | 88 | 88 |

The results in Table 3 indicate significant improvements in elongation with Examples 6 to 8, as compared to Examples C-8 to C-10.

While the invention has been explained in relation to various embodiments, it is to be understood that various modifications thereof may become apparent to those skilled in the art upon reading this specification. Therefore, it is to be understood that the invention includes all such modifications that may fall within the scope of the appended claims.

The invention claimed is:

1. A coating composition, comprising:
   water;
   an oxide of zinc present from 0.25 to 10 wt. % in the coating composition; and
   a polymer comprising (a) from about 0.5 to about 3 wt % based on the weight of the polymer of repeating units derived from itaconic acid; (b) from about 0 to about 2 wt % based on the weight of the polymer of repeating units derived from acrylic acid; (c) from about 94.5 to about 99.5 wt % based on the weight of the polymer of repeating units derived from one or more non-ionic mono-ethylenically unsaturated monomers; (d) from about 0 to about 5 wt % based on the weight of the polymer of repeating units derived from one or more multi-ethylenically unsaturated monomers; and (e) from about 0 to about 1 wt % based on the weight of the polymer of repeating units derived from one or more anionic mono-ethylenically unsaturated monomers other than itaconic acid and acrylic acid, wherein said polymer has a glass transition temperature in the range from about −50 to about +10° C.

2. The composition of claim 1 wherein the oxide of zinc is in the form of particulate solids.

3. The composition of claim 1 wherein the oxide of zinc is present from 1.5 to 5 wt. % in the coating composition.

4. The composition of claim 2 wherein the polymer has a glass transition temperature in the range from about −40 to about 0° C.

5. The composition of claim 1 wherein the one or more non-ionic mono-ethylenically unsaturated monomers comprise one or more acrylic acid esters, methacrylic acid esters, unsaturated nitriles, styrenic monomers, vinyl esters, vinyl ethers, conjugated dienes, olefins, halogenated monomers, allyl monomers, organosilanes, or a mixture of two or more thereof.

6. The composition of claim 1 wherein the one or more multi-ethylenically unsaturated monomers comprise allyl methacrylate, diallyl phthalate, 1,4-butylene glycol dimethacrylate, 1,6-hexanediol diacrylate, or a mixture of two or more thereof.

7. The composition of claim 1 wherein the polymer is derived from itaconic acid, styrene, acrylonitrile and 2-ethylhexyl acrylate.

8. The composition of claim 1 wherein the polymer is derived from itaconic acid, acrylic acid, styrene, acrylonitrile and 2-ethylhexyl acrylate.

9. The composition of claim 1 wherein the polymer is derived from itaconic acid, acrylamide, styrene, and n-butyl acrylate.

10. The composition of claim 1 wherein the polymer is derived from itaconic acid, acrylic acid, acrylamide, styrene and n-butyl acrylate.

11. The composition of claim 1 wherein the polymer is in the form of particulates with an average particle size in the range from about 100 to about 700 nanometers.

12. The composition of claim 1 wherein the polymer is present in the coating composition at a concentration in the range from about 10 to about 70 wt %.

13. The composition of claim 1 wherein the coating composition is applied to a substrate and dried or cured, the resulting coating containing from about 20 to about 70 wt % of the polymer.

14. The composition of claim 1 wherein the composition further comprises one or more stabilizers, defoamers, antioxidants, UV absorbers, carbodiimides, activators, curing agents, stabilizers, dyes, pigments, neutralizing agents, rheology modifiers, plasticizers, coalescing agents, waxes, slip and release agents, antimicrobial agents, surfactants, metals, coalescents, salts, flame retardant additives, dispersants, extender pigments, wetting agents, antiozonants, photosensitive additives, leveling agents, preservatives, coupling agents, or a mixture of two or more thereof.

15. A process comprising applying the composition of claim 1 to a substrate.

16. The process of claim 15 wherein the coating composition is applied to the substrate using air-assisted spray, airless spray, electrostatic spray, brushing, roller, mop, caulking gun or trowel.

17. The process of claim 15 wherein the substrate comprises masonry, wood, concrete, metal, glass, ceramics, plastic, plaster, stucco, roofing substrate, synthetic polymer membranes, or foamed insulation.

18. The process of claim 15 wherein the substrate comprises a previously painted, primed, undercoated, worn, or weathered substrate.

19. The process of claim 15 wherein the substrate comprises brick, concrete, blends of concrete or mortar and aggregate, stone, tile and/or stucco.

20. The process of claim 15 wherein the substrate comprises common brick, paving brick, face brick, drain tile, hollow block, cinder block, glazed brick, glazed tile, terracotta, conduit, roofing tile, ceramic tile, flue lining, mortar, cement, gypsum, marble, limestone, electrical insulators and/or thermal insulators.

* * * * *